United States Patent [19]

Smith et al.

[11] 3,873,591
[45] Mar. 25, 1975

[54] HALO-SUBSTITUTED CYANOMETHYL BENZENESULFONATES

[75] Inventors: Herbert Q. Smith, Malvern; Sameeh Said Toukan, Phoenixville, both of Pa.

[73] Assignee: Pennwalt Corporation, Philadelphia, Pa.

[22] Filed: July 5, 1973

[21] Appl. No.: 376,492

[52] U.S. Cl. .............. 260/456 P, 71/103, 424/303
[51] Int. Cl. ........................................ C07c 143/40
[58] Field of Search ................... 260/456 R, 456 P

[56] References Cited
OTHER PUBLICATIONS

Ichimura et al., "Chem. Abstracts", Vol. 73, p. 298, abstract 35000j (1970).

*Primary Examiner*—Bernard Helfin
*Assistant Examiner*—Norman P. Morgenstern
*Attorney, Agent, or Firm*—David Edwards

[57] ABSTRACT

Substituted cyanomethyl benzene sulfonates of the formula

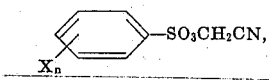

where X is halogen and $n$ is an integer of 1 to 3, are useful to protect substrates against fungal and bacterial growth.

2 Claims, No Drawings

HALO-SUBSTITUTED CYANOMETHYL BENZENESULFONATES

This invention relates to halo-substituted cyanomethyl benzenesulfonates which have good fungistatic and bacteriostatic potencies. More particularly, this invention concerns certain halo-substituted cyanomethyl benzene sulfonates useful as antimicrobial agents and which exhibit especially good inhibition of bacterial and fungal growth of fungus and mildew that commonly thrive in and on paint and painted surfaces, and of gram-positive type bacteria.

Cyanomethyl benzenesulfonate and cyanomethyl toluene-sulfonate are known compounds; "Preparation and Reactions of α-Cyanoalkyl Benzenesulfonates," H. W. Turner, Univ. Microfilms, Pub. No. 3082 (1952) (Chem. Abs. 47, 2726a); J. Lichtenberger and C. Faure, Bull. Soc. Chim. France, 1948, pp. 995–1001 (Chem. Abs. 43, 2941i). Neither reference suggests that cyanomethyl benzene sulfonates might have antimicrobial efficacy. Belgian Pat. No. 780,081 describes the treatment of seeds and soil with a cyanoalkyl arylsulfonate or an alkyl substituted derivative for protection against pathogens, but halo-substituted derivatives and their unique qualities are not suggested.

The compositions of this invention are halo-substituted cyanomethyl benzenesulfonates represented by the structure

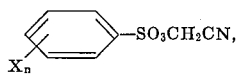

where X is halogen, i.e., chlorine, bromine, iodine and fluorine, and $n$ is an integer of 1 to 3. It has been discovered that the compounds embodied herein are very effective against certain fungal and bacterial species, particularly, paint fungus, exemplified by Pullularia pullulans, and gram positive bacteria, exemplified by Staphylococcus aureus. Accordingly, the halo-substituted compounds of this invention are especially and advantageously useful as paint fungicides and mildewcides. These results are deemed to be unexpected in view of the fact that the unsubstituted cyanomethyl benzenesulfonate, the alkyl (e.g. methyl) substituted derivative, the nitro-substituted derivative, and the thiophene analog thereof are relatively mediocre antimicrobial agents.

The halo-substituted cyanomethyl benzenesulfonates embodied herein are conveniently prepared by reacting substantially equimolar amounts of glycolonitrile and halo-substituted benzenesulfonyl chloride precursor, at a temperature ranging from about 0° to 100°C., preferably 0° to 25°C. The products are liquids at room temperature or solids which melt at rather moderate temperatures.

As previously mentioned, the primary locus of use of the compounds embodied herein is in paints, both oil-based and latex type. Such paint products, especially dispersions and emulsions, will be ordinarily attacked by bacteria and fungi during storage and subsequent use and thereby be rendered unserviceable. Painted surfaces in tropical sections, as in humid rooms (dairies, breweries, can factories, slaughter houses, and swimming pools), are susceptible to fungal and bacterial attack. In such cases, not only is esthetic damage a factor, but there is also the possibility of the proliferation of microorganisms and infection. The compounds of this invention are effective in preventing and/or inhibiting such microbial growth. The compounds may also be incorporated in other materials for antimicrobial protection, for example, cutting oils, polymeric materials, emulsion polishes for floor finishes, wood and lumber. Thus, an aspect of this invention is the process of inhibiting fungal and bacterial growth on substrates by incorporating therein or contacting therewith the halo-substituted cyanomethyl benzene sulfonates as described herein.

Next are presented illustrative procedures for preparing the cyanomethyl benzenesulfonates, and test data showing the efficacy of the claimed compounds in combatting the growth of representative bacterial and fungal species as compared to the compounds of the prior art and closely related compounds. All structures of synthesized compounds were confirmed by elemental analyses and infrared spectra.

EXAMPLE 1

Cyanomethyl benzenesulfonate,

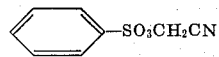

A pale, straw-colored oily liquid, $n_D^{20}$ 1.5231

EXAMPLE 2

Cyanomethyl p-toluenesulfonate,

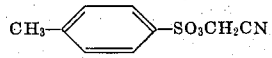

Method of preparation: 8.1 g (0.1 mole) of glycolonitrile (70% aqueous solution) is added to a cooled (15°–20° C.) mixture of 9.5 g (0.05 mole) of p-toluenesulfonyl chloride in 20 ml. of 1,2-dimethoxyethane and 50 ml. distilled water. A solution of 2.1 g (0.05 mole) of NaOH in 50 ml. distilled water is added slowly with stirring at 20°–25° C. over a period of 6.5 hours, maintaining the pH of the reaction mixture at about 8. The insoluble material is filtered off, washed with cold water, and dried at 40° C. under vacuum to yield 6.8 g (64% conversion) of the product, a light brown solid, m.p. 48°–50.5° C.

EXAMPLE 3

Cyanomethyl 2-thiophenesulfonate,

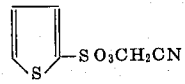

Method of preparation: Glycolonitrile is reacted with 2-thiophenesulfonyl chloride using the procedure as described in the previous example, with 2 hours of reaction at 0° C., followed by three hours at room temperature. The reaction mixture separates into two layers; the bottom dark layer is isolated and dissolved in diethyl ether, the solution washed with weak caustic solution and cold water, and the solvent is stripped off under reduced pressure to give the product (in 79% conversion), a green oily liquid, $n_D^{24.5}$ 1.535.

EXAMPLE 4

Cyanomethyl m-nitrobenzenesulfonate,

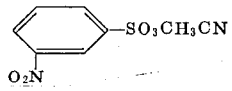

Preparation: The technique of Example 2 is used to react glycolonitrile with m-nitrobenzenesulfonyl chloride. The product is recovered from the reaction mixture by filtration and recrystallized from ethanol. The dried product (45% conversion) is an amber solid, m.p. 66°–69° C.

EXAMPLE 5

Cyanomethyl p-fluorobenzenesulfonate,

obtained in 87% conversion from the reaction of p-fluorobenzenesulfonyl chloride with glycolonitrile according to the procedure of Example 3. The product is a light pinkish liquid, $n_D^{24}$ 1.5082.

EXAMPLE 6

Cyanomethyl p-bromobenzenesulfonate,

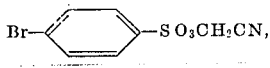

obtained in 44% conversion from the reaction of p-bromobenzenesulfonyl chloride with glycolonitrile according to the procedure of Example 4. The product is a white solid, m.p. 57°–59° C. The iodine analog, cyanomethyl p-iodobenzenesulfonate,

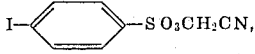

a white solid, m.p. 87°–90° C., is similarly prepared in 73% conversion by reacting glycolonitrile with p-iodobenzenesulfonyl chloride.

EXAMPLE 7

Cyanomethyl p-chlorobenzenesulfonate,

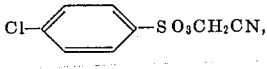

obtained in 51% conversion from the reaction of p-chlorobenzenesulfonyl chloride with glycolonitrile according to the procedure of Example 3. The product is a colorless liquid, $n_D^{24}$ 1.5442.

EXAMPLE 8

Cyanomethyl 3,4-dichlorobenzenesulfonate,

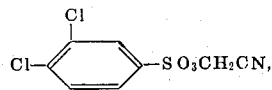

obtained in 88% conversion from the reaction of 3,4-dichlorobenzenesulfonyl chloride with glycolonitrile according to the procedure of Example 3. The product is recovered as a slightly pinkish, viscous liquid which, on standing at room temperature, crystallizes out as a light pink solid, m.p. 46°–49° C.

EXAMPLE 9

Cyanomethyl 2,4,5-trichlorobenzenesulfonate,

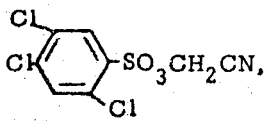

obtained in 65% conversion from the reaction of 2,4,5-trichlorobenzenesulfonyl chloride with glycolonitrile according to the procedure of Example 4. The product is a white solid, m.p. 80°–83° C.

All of the compounds prepared above are insoluble in water, but are very soluble in a variety of typical solvents, for example, acetone, diacetone alcohol, and dimethylformamide.

A convenient and meaningful method of measuring and evaluating the effectiveness of antibacterial and antifungal compositions known as the "Agar Dilution method" is employed, using various amounts and ratios of the individual antibacterial agents. Briefly stated, the test consists in dissolving the biocidal agent in an appropriate solvent (e.g., acetone) to obtain a stock solution 10 times the highest concentration to be tested. This stock solution is then diluted by mixing 3 ml. of the stock solution with 27 ml. of sterile nutrient agar. From this test concentrate, the other test concentrations are made by direct dilution (or some of the subsequent lower concentrations) with the required amounts of untreated agar. The test mixtures are then poured into Petri dishes to fill one half of the area. The other half contains the untreated control agar. Both the treated and untreated agar are then seeded with appropriate representative test organisms by streaking across the plate. After an appropriate incubation time (one to several days), the plates are examined for inhibition properties of the agent against the test organism.

Representative organisms used in the tests are the common or general type fungus *Aspergillus niger* (ATCC-6275), the typical paint fungus *Pullularia pullulans* (ATCC-9348), the resistant gram positive bacteria *Staphylococcus aureus* (ATCC-6538), and the gram negative bacteria *Escherichia coli* (ATCC-11229). The stock solution is 1% concentration of agent in acetone.

The following legend is used in the table summary of results set forth below.

Bacterial and Fungal Growth

0 = No growth; ± = Trace growth; 1 = Partial growth; 2 = Intermediate growth; 3 = Moderate growth; 4 = Heavy growth. (That is, the lower the number result noted, the more effective the agent is in inhibiting bacterial or fungal growth).

BACTERIOSTATIC AND FUNGISTATIC ACTIVITIES OF CYANOMETHYL BENZENESULFONATES (Growth Observed at Stated Concentration of Agent in Parts per Million Parts of Culture Medium)
Fungus or Bacterium Species

| Agent, Example No. | Pullularia pullulans | | | | | | Staphylococcus aureus | | | | | Aspergillus niger | | | | Escherichia coli | | | |
|---|---|---|---|---|---|---|---|---|---|---|---|---|---|---|---|---|---|---|---|
| | 0.5 | 1 | 2 | 5 | 10 | 20 | 1 | 2 | 5 | 10 | 20 | 2 | 5 | 10 | 20 | 5 | 10 | 20 | 50 |
| (1) | | | 4 | 4 | 4 | 4 | | 4 | 4 | 4 | 4 | 4 | 4 | 4 | 4 | 4 | 4 | 4 | 3 |
| (2) | | | 4 | 4 | 4 | 4 | | 4 | 4 | 4 | 3 | 4 | 4 | 4 | 4 | 4 | 4 | 4 | 4 |
| (3) | | | 4 | 4 | 4 | 4 | 4 | 4 | 4 | 3 | | 4 | 4 | 4 | 3 | 4 | 4 | 2 | ± |
| (4) | | | | 4 | 3 | ± | 4 | 4 | 4 | 4 | 4 | | 4 | 4 | 4 | 4 | 4 | 4 | 4 |
| (5) | | | | 4 | 1 | 0 | 4 | 4 | 4 | 3 | | | 4 | 4 | 3 | | 4 | 4 | 4 |
| (6) | | | | 3 | ± | 0 | | 4 | 2 | 1 | | | 4 | 3 | 3 | | 4 | 4 | 3 |
| (7) | | | | 4 | 2 | 0 | | 4 | 3 | 2 | | | 4 | 4 | 3 | | | | |
| (8) | | | | 1 | 0 | 0 | | 3 | 1 | 0 | 0 | | 4 | 3 | 0 | 4 | 4 | 4 | 3 |
| (9) | 4 | 3 | 2 | 0 | 0 | 0 | | 4 | 3 | ± | | | 4 | 4 | 3 | | 4 | 4 | 2 |

The foregoing results demonstrate that the halo-substituted compounds of the invention (represented by Examples 5–9) are significantly effective against the common paint fungus, and in most cases, quite effective against the gram positive bacteria. In contrast, the prior art compounds (Examples 1 and 2), the thiophene analog (Exp. 3) and the nitro-substituted derivative (Exp. 4) are comparatively ineffective in inhibiting growth of such microorganisms. Surprisingly, few of the compounds are very effective in inhibiting the growth of gram negative bacteria or of *Aspergillus niger*, which points up the unusual, selective activity of the compounds of this invention.

We claim:

1. A halo-substituted cyanomethyl benzenesulfonate of the formula

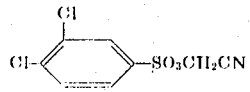

2. A halo-substituted cyanomethyl benzenesulfonate of the formula

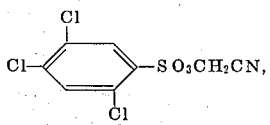

* * * * *